Figure 1:
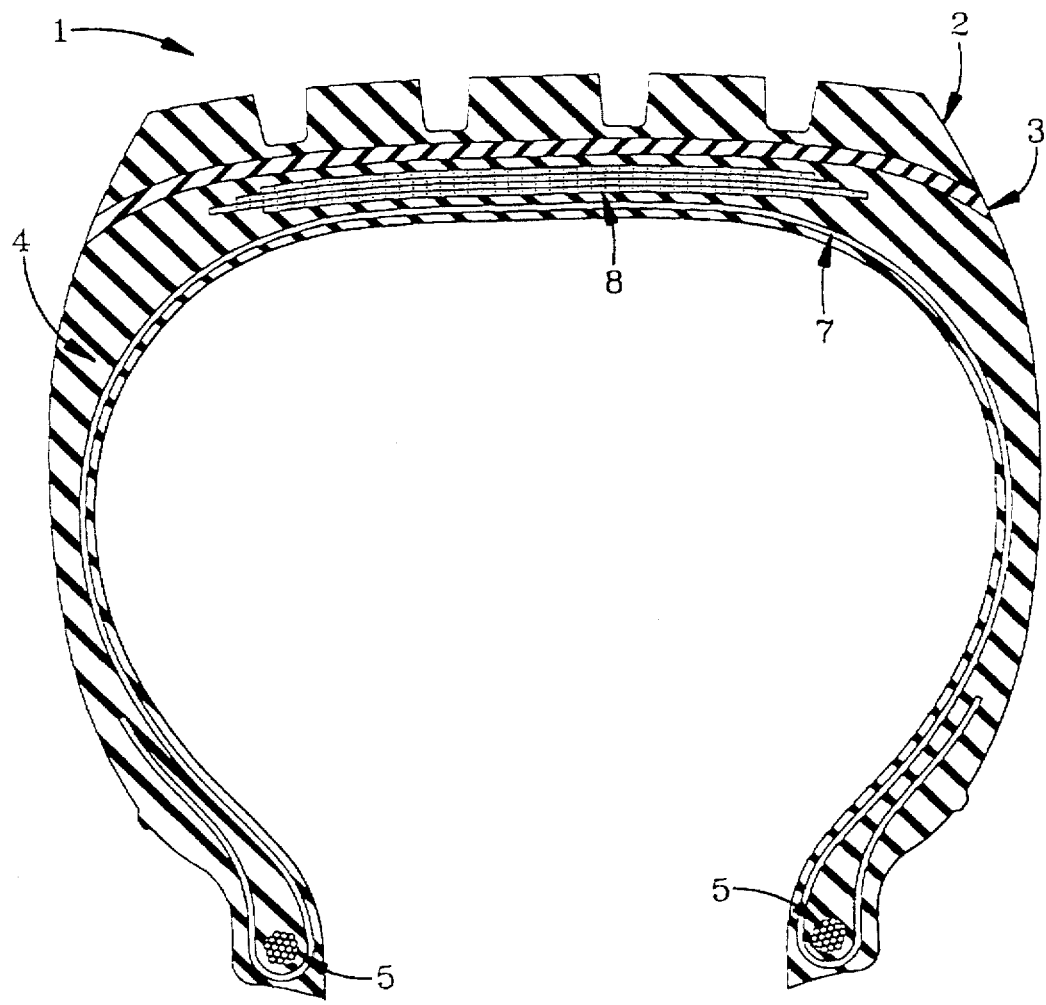

United States Patent [19]
Fourgon

[11] Patent Number: 5,718,782
[45] Date of Patent: Feb. 17, 1998

[54] TRUCK TIRE WITH CAP/BASE CONSTRUCTION TREAD

[75] Inventor: Fernand Antoine Joseph Fourgon, Bastogne, Belgium

[73] Assignee: The Goodyear Tire & Rubber Company, Akron, Ohio

[21] Appl. No.: 612,473

[22] Filed: Mar. 7, 1996

[51] Int. Cl.⁶ .................. B60C 1/00; B60C 11/00
[52] U.S. Cl. ........................ 152/209 R; 525/237
[58] Field of Search ............ 152/209 R, 209 D; 524/492, 493; 525/236, 237

[56] References Cited

U.S. PATENT DOCUMENTS

| | | | |
|---|---|---|---|
| 3,768,537 | 10/1973 | Hess et al. | 152/209 R |
| 4,414,363 | 11/1983 | Akita et al. | 525/237 |
| 4,519,430 | 5/1985 | Ahmad et al. | 152/209 R |
| 5,066,721 | 11/1991 | Hamada et al. | 525/102 |
| 5,087,668 | 2/1992 | Sandstrom et al. | 152/209 R |
| 5,225,011 | 7/1993 | Takino et al. | 152/209 R |
| 5,294,663 | 3/1994 | Fabris et al. | 525/237 |
| 5,405,927 | 4/1995 | Hsu et al. | 152/209 R |
| 5,447,971 | 9/1995 | Bergh et al. | 152/209 R |
| 5,504,140 | 4/1996 | Zanzig et al. | 525/237 |

FOREIGN PATENT DOCUMENTS

| | | | |
|---|---|---|---|
| 7602 | 1/1991 | Japan | 152/209 R |
| 65406 | 3/1991 | Japan | 152/209 R |

*Primary Examiner*—Steven D. Maki
*Attorney, Agent, or Firm*—Henry C. Young, Jr.

[57] ABSTRACT

The invention relates to a tire with a rubber tread of a cap/base construction wherein the tread cap is composed of cis 1,4-polyisoprene natural rubber, isoprene/butadiene copolymer rubber and cis 1,4-polybutadiene rubber, reinforced with precipitated silica and carbon black, and the underlying tread base is composed primarily of natural cis 1,4-polyisoprene rubber reinforced with carbon black. The invention particularly relates to truck tires and to bus tires which are collectively referred to herein as "truck tires".

5 Claims, 1 Drawing Sheet

TRUCK TIRE WITH CAP/BASE CONSTRUCTION TREAD

FIELD

This invention relates to a tire with a rubber tread of a cap/base construction wherein the tread cap is composed of cis 1,4-polyisoprene natural rubber, isoprene/butadiene copolymer rubber and cis 1,4-polybutadiene rubber, reinforced with precipitated silica and carbon black, and the underlying tread base is composed primarily of natural cis 1,4-polyisoprene rubber reinforced with carbon black.

The invention particularly relates to truck tires and bus tires which are collectively referred to herein as "truck tires".

BACKGROUND

Pneumatic rubber tires are conventionally prepared with a tread composed of elastomer(s) reinforced with carbon black and sometimes with silica or a combination of carbon black and silica.

This invention is more specifically directed to truck tires and other relatively large tires including relatively heavy duty light truck tires, which are normally expected to be capable of supporting and carrying relatively large vehicular loads and, thus, tend to generate a greater internal temperature than comparable passenger vehicle-type tires.

The truck tire treads are typically of a cap/base construction, with the tread cap designed to be ground-contacting and, thus, contain a lug/groove, or rib/groove ground-contacting configuration, and with the tread base underlying and supporting the tread cap and positioned between the tread cap and the tire carcass. Generally, the tread cap and tread base are co-extruded together as an uncured component of the tire construction and cured, or vulcanized together with the overall tire construction in a suitable mold under conditions of elevated temperature and pressure. Such constructions and method of preparation are well known to those having skill in such art.

The tread base is not normally intended to be ground-contacting and, thus, not normally intended to have the same measure of tread properties as, for example, the tread cap properties of traction and treadwear.

For such relatively heavy duty tires, heat buildup, evidenced by tire running temperature buildup, or increase, is normally unwanted, although a substantial portion of the heat buildup, or temperature increase, is relatively unavoidable during a running of the tire under load.

However, it remains to be desirable to provide a rubber tire tread for use with tires on various trucks and buses, including light to medium trucks, which will have better treadwear but with substantially equivalent internal heat generation. The substantially equivalent internal heat generation under typical operational conditions is considered important herein particularly since higher tire running conditions tend to prematurely age the tire rubber and associated tire construction and, thus, tend to shorten the effective life of the tire, which may include the tire carcass. Further, the effective life of the carcass is considered herein to be important because it is desirable to retread the carcass after the tire tread becomes worn.

It is envisioned that such tread would be of a cap/base construction where the tread base is primarily of a natural rubber composition reinforced with carbon black. Cap/base constructions for tire treads is well known to those skilled in such tire tread art. For example, see U.S. Pat. No. 3,157,218 which is intended to be incorporated herein by reference as being illustrative of such tread construction.

It is further envisioned that the tread cap be reinforced with a precipitated silica, accompanied with a silica coupler, and carbon black reinforcement.

In one aspect, it is desired to provide a truck tire with enhanced treadwear characteristics.

A purpose of utilizing silica as reinforcement for the tread cap elastomer in a tread of cap/base construction, with tread cap rubber of natural rubber/synthetic rubber composition, is to provide a tire tread construction which can run about as cool as and with acceptable treadwear as compared to a natural rubber tread reinforced with carbon black. It is contemplated that a truck tire running under loaded conditions with a quantitatively silica reinforced rubber tread cap, in a tread of cap/base construction, would experience less temperature buildup than a truck tire with a comparable carbon black reinforced rubber tread cap.

The term "phr" where used herein, and according to conventional practice, refers to "parts of a respective material per 100 parts by weight or rubber, or elastomer".

In the description of this invention, the terms "rubber" and "elastomer", where used herein unless otherwise prescribed, are used interchangeably. The terms "rubber composition", "compounded rubber" and "rubber compound" where used herein unless otherwise prescribed, are used interchangeably to refer to "rubber which has been blended or mixed with various ingredients or materials" and such terms are well known to those having skill in the rubber mixing, or rubber compounding, art.

The Tg of a polymer, particularly an elastomer, as used herein unless otherwise prescribed, refers to its glass transition temperature which can conventionally be determined, for example, by a differential scanning calorimeter at heating rate of 15° C. to an observed transition of the temperature versus time curve. It is understood that such Tg determination is well known to those having skill in such art.

SUMMARY AND PRACTICE OF THE INVENTION

In accordance with this invention, a pneumatic tire having a TRA rated maximum load limit of at least about 1220 kg, (2684 lbs), alternatively at least about 2730 kg, (6006 lbs), and generally in a range of about 2043 kg to about 5000 kg, (about 4494 to about 11,000 lbs) at an inflation pressure in a range of about 723 kpa to about 792 kpa (about 105 to about 115 psi) and a bead diameter of at least about 48 cm (19 inches), alternatively at least about 56 cm (22 inches), and generally in a range of about 48 to about 64 cm (about 19 to about 25 inches) characterized in that, for its cap/base construction:

(A) the tread cap is comprised of, based on 100 parts by weight (phr) elastomers (1) elastomers comprised of (a) about 50 to about 65, alternatively about 56 to about 60, phr of cis 1,4-polyisoprene natural rubber, (b) about 20 to about 40, alternatively about 30 to about 34, phr of cis 1,4-polybutadiene rubber and (c) about 10 to about 15, alternatively about 8 to about 12, phr of isoprene/butadiene copolymer rubber having an isoprene content in a range of about 40 to about 60 percent and a Tg in a range of about −60° C. to about −90° C., (2) about 45 to about 60, alternatively about 50 to about 55, phr of silica and carbon black reinforcing filler comprised of (a) about 10 to about 15, alternatively about 8 to about 12 phr of particulate, precipitated silica, and, correspondingly, (b) about 35 to about 45, alternatively about 40 to about 44, phr of reinforcing carbon black, (3) at least one silica coupler having a moiety reactive with the surface of the silica and an additional moiety interactive with the said elastomers, (B) the tread base elastomer is cis 1,4-polyisoprene natural rubber reinforced with about 20 to about 60, alternatively about 25 to about 40, phr of carbon black.

The weight ratio of silica to carbon black for said tread cap is typically preferably in a range of about 1/2 to about 10/1.

In general, the silica typically is a precipitated silica having a BET surface area of about 100 to about 300 m²/g and a DBP value DBP absorption value in a range of about 100 to about 350, preferably about 150 to about 300 m²/g.

The aforesaid TRA "maximum rated load limit" characteristic of the tire is intended to differentiate present a truck tire typically designed for running under load conditions substantially higher than conventional passenger tire loads. The term "TRA" refers to "The Tire and Rim Association Inc." which is well known to those familiar with tire manufacturing. It is referred to herein as "TRA". The TRA is an association which has, as a purpose " . . . the establishment and promulgation of interchangeability standards for tires, rims and allied parts for the guidance of manufacturers of such products . . . ". The TRA publishes an annual Yearbook, for example the 1995 Yearbook, which includes, for example, characterizations of truck tires and passenger tires, including maximum rated load values at various inflation pressures. It can readily be seen that, most truck tires, particularly for medium truck tires and above, have maximum rated load values at various inflation pressures significantly greater than conventional passenger tires. Therefore, it is considered herein that such values effectively differentiate the intended truck tires for this invention from passenger tires. For the purposes of the description of this invention, the rim diameters referenced in the TRA Yearbook are equated to tire bead diameters. Appropriately, the tire bead diameters are herein considered as being measured from the surface of the rubber encapsulated wire beads and not the wire portion of the beads, as is believed herein is appropriate.

As hereinbefore pointed out, it is considered herein that the truck tires, and usually bus tires, usually have an appreciably greater need for relatively cooler running ability than passenger tires which are expected to be utilized for substantially reduced loads.

In one aspect, it is desired herein for the truck tires to have acceptable treadwear properties while also having acceptable relatively cool running properties.

For such purposes of this invention, it is considered herein that a tread of cap/base construction is desirable where the tread base is primarily composed of cis 1,4-polyisoprene natural rubber and where the tread cap and tread base compositions cooperate to promote such overall effects.

In practice, such cap/base tread construction is created by co-extruding the tread cap and tread base together through a singular die to form the extruded tread construction. Typically, the unvulcanized compounded rubber compositions for the tread cap and tread cap are extruded through the die at a temperature, for example, in a range of about 100° C. to about 125° C., often typically about 110° C. and, thus, is considered as being a relatively hot extrusion process, although such actual extrusion temperatures themselves are considered normal for a rubber extrusion process. The extruded tread stock is then built onto a rubber tire carcass to create an assembly thereof. The assembly is then vulcanized, or cured, at an elevated temperature. Such overall process is well known to those skilled in such art.

In this manner then, by the aforesaid co-extrusion process and the co-vulcanization of the tread cap and tread base, the tread cap and tread base are considered herein to be an integral, cooperative, unit of the tire. Therefore, it is considered herein that the tread cap and tread base desirably cooperate together to promote the treadwear with acceptable and sufficiently relatively cool running effect for the tire. By the term "relatively cool running for the tire tread" it is meant that "internal operating temperatures are sufficiently low so as to minimize heat degradation, on a relative basis, of the tire tread rubber compositions".

Thus treadwear, together with an acceptable relatively cool running property, for the tire is intended to be manifested in a longer service life for the tire carcass, or casing.

The rubber blend for the tread cap, which is intended to be ground-contacting during use of the tire, and is required to be composed of the natural rubber as well as cis 1,4-polybutadiene rubber and isoprene/butadiene copolymer rubber which is considered herein to be an important feature of the invention, when reinforced with precipiced silica and silica coupler, together with carbon black which is designed to enhance such tire properties as treadwear and relatively low running temperature.

In particular, the isoprene/butadiene copolymer rubber has a relatively very low Tg in a range of about −60° C. to about −80° C. which is considered herein to be significant and beneficial for the tire tread cap to promote improved treadwear and to act as a phase compatibilizer between natural rubber (1,4-polyisoprene) and cis 1,4-polybutadiene rubber.

The utilization of the cis 1,4-polybutadiene rubber is considered herein to be significant and beneficial for the tire tread cap to promote improved treadwear.

The natural, cis 1,4-polyisoprene rubber is considered herein to be significant and beneficial for the tire tread cap to promote tear resistance and a reduction or avoidance of chipping-chomping of tread blocs.

The accompanying drawings are provided for further understanding of the invention, although it is not intended that the invention be limited to the presentation of the drawings. In the drawings;

FIG. 1 is a cross-sectional, partial view of a vulcanized tire showing a tread with a cap/base construction where the tread cap is of a lug and groove configuration, and where the tread base supports the tread cap and extends to the outer side surface of the tire, together with a portion of a supporting radial ply carcass. Sometimes a tire tread configuration, composed of lugs and grooves, also contains ribs which are not shown in this drawing. Such tire lug and groove construction, with and without ribs, are well known to those having skill in such art.

Figure 2:
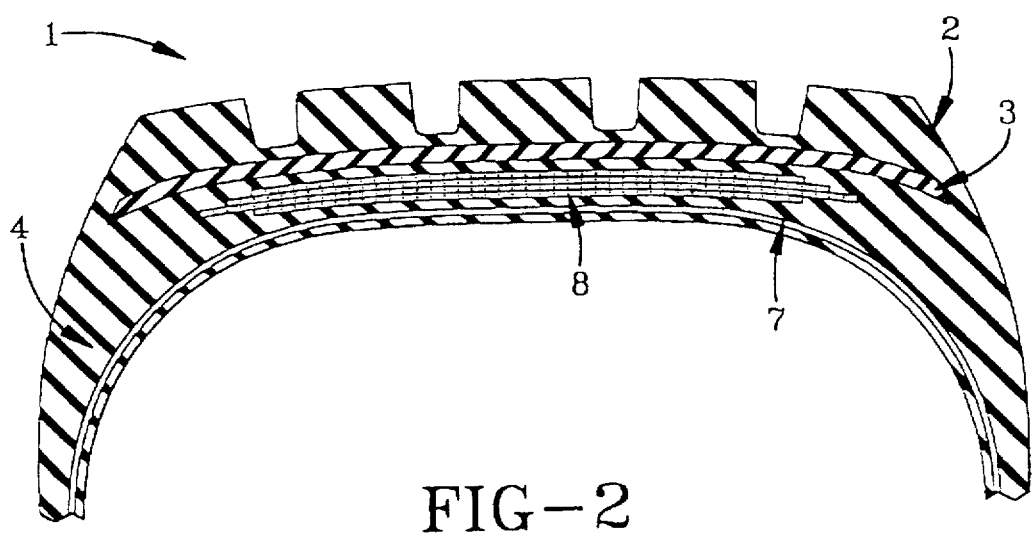

FIG. 2 is a cross-sectional view of a vulcanized tire showing a tread with a cap/base construction where the tread cap is of a lug and groove configuration, together with a portion of a supporting radial ply carcass, wherein the tread base supports the tread cap and terminated within the shoulder region of the tire carcass.

Referring to the drawings, a tire construction 1 is provided with a circumferential tread component composed of a tread cap 2 and tread base 3 construction. The tread cap 2 and tread base 3 is a co-extruded component of the tire 1. The tire has a carbon black reinforced rubber carcass 4 which is composed of spaced beads 5 encased with carbon black reinforced rubber, carbon black reinforced rubber sidewalls 6 and supporting carcass plies 7 and circumferential belt 8. In one aspect the carcass plies 7 of the carcass 4, for the truck tire, has steel cord reinforcement.

The rubber tread base 3 is carbon black reinforced with about 35–40 phr of carbon black and the sidewall rubber 6 and rubber for the beads 5 are reinforced with at least about 40 phr of carbon black. The tread base elastomer is cis 1,4-polyisoprene natural rubber.

The rubber tread cap 2 is composed of cis 1,4-polyisoprene natural rubber, cis 1,4-polybutadiene rubber and isoprene/butadiene copolymer rubber reinforced with at least 10 phr of precipitated silica and at least 40 phr of carbon black, so long as the weight ratio of silica to carbon black is at least about 4/1.

The siliceous pigments to be used as reinforcement in the tread cap of this invention are precipitated siliceous pigments (silica). Such precipitated silica are prepared, for example, by controlled acidification of a soluble silicate, e.g., sodium silicate.

The siliceous pigments (precipitated silica) typically have a BET surface area, as measured using nitrogen gas, is preferably in the range of about 80 to about 300, perhaps even up to about 360, although more usually about 100 to about 200, square meters per gram. A BET method of measuring surface area is described in the *Journal of the American Chemical Society*, Volume 60, page 304 (1930).

The silica, as hereinbefore referenced, also typically has a dibutylphthalate (DBP) absorption value in a range of about 100 to about 350, and more typically about 150 to about 300 cc/100 gm.

Various commercially available silicas may be considered for use in the tread of this invention, particularly the tread cap, such as, for example only and without limitation, silica commercially available from Rhone-Poulenc, such as, for example, Zeosil 1165MP, silica available from Degussa AG with designations such as, for example, BV3370GR, and silica available from J. M. Huber such as, for example, Zeopol 8745.

It is readily understood by those having skill in the art that the rubber composition of the tread rubber would be compounded by methods generally known in the rubber compounding art, such as mixing the various sulfur-vulcanizable constituent rubbers with various commonly used additive materials such as, for example, curing aids, such as sulfur, activators, retarders and accelerators, processing additives, such as oils, resins including tackifying resins, silica, and plasticizers, fillers, pigments, fatty acid, zinc oxide, waxes, antioxidants and antiozonants, peptizing agents and reinforcing materials such as, for example, silica and carbon black. As known to those skilled in the art, depending on the intended use of the sulfur vulcanizable and sulfur vulcanized material (rubbers), the additives mentioned above are selected and commonly used in conventional amounts.

Typical additions of carbon black, silica and silica coupler for this invention are hereinbefore set forth.

Typical amounts of tackifier resins, if used, comprise about 0.5 to about 10 phr, usually about 1 to about 5 phr. Typical amounts of processing aids comprise about 1 to about 30 phr. Such processing aids can include, for example, aromatic, napthenic, and/or paraffinic processing oils and blends of various fatty acids such as, for example, various zinc based soaps.

Typical amounts of antioxidants comprise about 1 to about 5 phr. Representative antioxidants may be, for example, diphenyl-p-phenylenediamine and others, such as, for example, those disclosed in the *Vanderbilt Rubber Handbook* (1978), pages 344–346. Typical amounts of antiozonants comprise about 1 to 5 phr. Typical amounts of fatty acids, if used, which can include stearic acid, usually commercially provided as a blend of stearic acid and other similar fatty acids such as palmitic acid, etc, comprise about 0.5 to about 4 phr.

Typical amounts of zinc oxide comprise about 2 to about 5 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide.

The vulcanization is conducted in the presence of a sulfur vulcanizing agent. Examples of suitable sulfur vulcanizing agents include elemental sulfur (free sulfur) or sulfur donating vulcanizing agents, for example, an amine disulfide, polymeric polysulfide or sulfur olefin adducts. Preferably, the sulfur vulcanizing agent is elemental sulfur. As known to those skilled in the art, sulfur vulcanizing agents are used in an amount ranging from about 0.5 to about 4 phr, with a range of from about one to about 2.5, being preferred.

Accelerators are used to control the time and/or temperature required for vulcanization and to improve the properties of the vulcanizate. Retarders are also used to control the vulcanization rate. In one embodiment, a single accelerator system may be used, i.e., primary accelerator. Conventionally and preferably, a primary accelerator(s) is used in total amounts ranging from about 0.5 to about 4, preferably about 0.8 to about 2.5, phr. In another embodiment, combinations of a primary and/or a secondary accelerator might be used, with the secondary accelerator being used in amounts of about 0.05 to about 3 phr, for example, in order to activate and to improve the properties of the vulcanizate. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound. The presence and relative amounts of sulfur vulcanizing agent and accelerator(s) are not considered to be an aspect of this invention which is more primarily directed to the use of silica as a reinforcing filler in combination with a coupling agent in a prescribed rubber blend.

The presence and relative amounts of the above additives are not considered to be an aspect of this invention, except as may hereinbefore be set forth, of the present invention which is more primarily directed to the truck tire with required size and load characteristics which utilizes a tread of cap/base construction with specified combinations of elastomers in the tread cap and tread base with the tread base elastomer being reinforced with carbon black, and tread cap elastomers being reinforced with a filler of prescribed precipitated silica and carbon black, with the silica required to be used in conjunction with a silica coupler.

The tire can be built, shaped, molded and cured by various methods which will be readily apparent to those having skill in such art.

The invention may be better understood by reference to the following examples in which the parts and percentages are by weight unless otherwise indicated.

EXAMPLE I

A rubber composition (compounded rubber) was prepared of cis 1,4-polyisoprene natural rubber, cis 1,4-polybutadiene rubber and isoprene/butadiene copolymer rubber and is referred to herein as "Sample B". A Control rubber composition composed of natural rubber (cis 1,4-polyisoprene) was prepared and referred to herein as Control "Sample A".

A tread base rubber composition was prepared composed of cis 1,4-polyisoprene natural rubber was prepared and identified herein as "Sample Y".

The rubber compositions were prepared by mixing the ingredients in several sequential non-productive mixing stages (without the curatives) followed by a final productive mixing stage (basically for the curatives), then the resulting composition was cured under conditions of elevated temperature and pressure, namely, for about 32 minutes for about 150° C.

For the non-productive mixing stages, exclusive of the accelerator(s), sulfur curatives, and part of the antioxidants which are added in the final, productive mixing stage, the ingredients were mixed in the first non-productive stage except that the carbon black was added in the first non-productive mix stage(s) and the silica and coupler were added in the third non-productive mix stage. The ingredients may be mixed in each of the non-productive mixing stages for about one to about five minutes to a temperature of about 165° C., all in a Banbury internal type of mixer.

To the resulting rubber composition (mixture) may be then mixed, in the final, productive mixing stage, the remaining ingredients in a Banbury internal type mixer for about one to about 2 minutes to a temperature of about 120° C.

The rubber was then used to prepare a tire tread which was built onto a tire carcass to form a tire assembly thereof and the tire assembly vulcanized under conditions of elevated temperature and pressure.

The rubber composition was comprised of the ingredients illustrated in Table 1. The values, for the most part, are simply rounded to the nearest whole number.

TABLE 1

| Sample # | A | B | Y |
|---|---|---|---|
| Non-Productive Mix Stages | | | |
| Natural Rubber[1] | 100 | 60 | 100 |
| Polybutadiene[2] | | 30 | |
| IBR[3] | | 10 | |
| Carbon black[4] | 40 | 44 | 37 |
| Processing Oil, Aromatic | 2 | 2 | 2 |
| Fatty Acid | 4 | 2 | 1 |
| Silica[5] | 15 | 10 | |
| Plasticizers, resins and waxes | 1.5 | 5.1 | 0.1 |
| Coupling Agent[6] | 3 | 4 | |
| Productive Mix Stage | | | |
| Zinc Oxide | 5 | 3.5 | 5 |
| Antioxidants[7] | 2.77 | 3 | 3.5 |
| Sulfur | 0.9 | 1.3 | 1.75 |
| Sulfenamide Aniline Type Accelerators | 1.69 | 1 | 1.5 |

[1]Cis 1,4-polyisoprene natural rubber.
[2]Cis 1,4-polybutadiene rubber obtained as NEO Cis BR 40 from the Enichem company.
[3]Isoprene/butadiene copolymer rubber having an isoprene content of about 30 percent and a Tg of about −83° C. obtained from The Goodyear Tire & Rubber Company.
[4]Carbon black added as N-121.
[5]A silica obtained as Zeosil 1165 MP from the Rhone-Poulenc company which is understood to have a BET surface area in a range of about 160 to about 200.

TABLE 1-continued

| Sample # | A | B | Y |
|---|---|---|---|

[6]Obtained as bis-3-triethoxysilylpropyl) tetrasulfide (50% active) commercially available as X50S from Degussa as a 50/50 blend of the tetrasulfide with N330 carbon black (thus, considered 50% active). Technically, the tetrasulfide is believed to be an organosilane polysulfide as a composite, or mixture, having an average number of sulfur atoms in a polysulfide bridge in a range of about 3.5 to about 4 connecting sulfur atoms, although the composite, or mixture may contain individual organosilane polysulfides with about 2 to about 8 connecting sulfur atoms.
[7]Of the diarylparaphenylene diamine and dihydro-trimethylquinoline type.

Various properties of the cured samples were determined by conventional means and reported in the following Table 2.

TABLE 2

| Sample # | A | B | Y |
|---|---|---|---|
| 300% Modulus (MPa) | 15.1 | 12.1 | 12.1 |
| Tensile Strength (MPa) | 26.0 | 23.0 | 28.0 |
| Elongation (%) | 490 | 490 | 550 |
| Hardness Shore A | 67 | 68 | 60 |
| Rebound (100° C.) | 66.4 | 66.4 | 81 |
| Flexometer Temperature (°C.) | 27.7 | 30.9 | 14.0 |
| Percent Set | | | |
| E' at 100° C. (MPa) | 1.65 | 1.75 | 1.29 |
| Tan. Delta at 100° C. | .13 | .14 | .08 |
| Tear resistance (N/mm) | 31 | 23 | 20 |

The hot rebound value for experimental Sample B, as compared to Control Sample A show a predictive equal heat generation between the natural rubber/synthetic rubber composition for Sample B and the control natural rubber composition Sample A. The hot rebound value is indicative of the rubber composition's hystersis which, in turn, is predictive of a measure of potential internal heat generation for the rubber composition during dynamic working conditions. This is considered herein to be beneficial because equal heat generation would tend to indicate that tire tread life for tires with treads of the two rubber compositions, at least as relates to heat durability, might be substantially equivalent.

Also, the higher 300 percent dynamic modulus value for experimental Sample B, as compared to Control Sample A is indicative of higher stiffness. Such property is predictive of a tire tread with rubber composition of experimental Sample B as having better treadwear as well as improved dry handling when mounted on a wheel on a vehicle and operated under working conditions as compared with a similar tire with a tread composed of the rubber composition of Control Sample A.

In particular, it is considered herein that rubber composition properties of the experimental tire tread cap rubber composition B taken together with tire base composition Y, particularly when compared with comparative control composition A, are predictive that a cap/base tread construction of this invention will provide a tire with enhanced treadwear while having substantially equivalent heat buildup.

Regarding the various tests, for the tensile elongation and 300% modulus values tests, refer to ASTM Test D412-92, method B.

For the rebound tests, refer to DIN 53512.

For the hardness, Shore A, as in ASTM 2240-91, may be referred to at room temperature, or about 23° C.

For the flexometer test, refer to ASTM Test D623. The flexometer test is considered herein to be significant because it specifically measures the temperature rise in the rubber test sample and the dimensional changes of the sample over time. The flexometer test is well known to those skilled in rubber composition evaluations particularly for use in tires.

For the E' values, which are sometimes referred to as the "tensile storage modulus", reference may be made to *Science and Technology of Rubber, second edition*, 1994, Academic Press, San Diego, Calif., edited by James E. Mark et al, pages 249–254. The use of the storage modulus, E', to characterize rubber compositions is well known to those having skill in such art.

The tangent delta, or tan. delta, is a ratio of the tensile loss modulus, also known as E", to the tensile storage modulus (E'). These properties, namely the E', E" and tan. delta, characterize the viscoelastic response of a rubber test sample to a tensile deformation at a fixed frequency and temperature, measured at 100° C.

The tan. delta and tensile storage modulus (E') are well known to those skilled in the rubber composition characterization art, particularly as relates to tires and tire treads. The tensile storage modulus (E') values are indicative of rubber compound stiffness which can relate to treadwear rates and evenness of treadwear. The tan. delta value at 100° C. is considered as being indicative of hysteresis, or heat loss.

EXAMPLE II

Tires of size 295/80/R22.5 where produced with treads of co-extruded cap/base construction with the tread base being of the Sample Y composition and the tread cap being rubber compositions shown as experimental Sample B and Control Sample A of Example I herein as demonstrated in Table 1 and correspondingly identified herein as experimental tire B and Control tire A.

The tires were tested by conventional tire testing procedures with results shown in the following Table 2. The values for the Control Tire A are normalized to values of 100 and the associated values for Tire B is recited with values comparative to the values for the Control Tire A.

TABLE 3

| Test Values | Tire A | Tire B |
| --- | --- | --- |
| Endurance (ECE 54) | 100 | 95 |
| Rolling Resistance | 100 | 95 |
| Treadwear | 100 | 116–119 |

Table 3 shows that the tire of this invention was observed to provide a dramatically increased treadwear value in a range of about 116 to about 119, an average range of values for two tests of four tires each. It is considered that this benefit, as compared to the control tire A, is primarily due to the tread cap rubber composition utilized for the tire, namely the combination of the cis 1,4-polyisoprene rubber, isoprene/butadiene copolymer rubber and cis 1,4-polybutadiene rubber together with the carbon black and silica reinforcement (with its attendant silica coupler), in combination with the tread base of cis 1,4-polyisoprene rubber composition.

The recited endurance values are according to ECE (European regulation), test No. 54 for tire endurance. The comparative tire endurance values show that Tire A ran slightly longer before failing, an indication that somewhat less internal heat is generated by tire B. This result is considered very significant because the experimental tire tread cap/base combination B resulted in considerably better wear with substantially equivalent heat generation. The improved wear is beneficial for tired life on a tread wear basis and the substantially equivalent heat generation is also beneficial for tire endurance, or tire life.

While certain representative embodiments and details have been shown for the purpose of illustrating the invention, it will be apparent to those skilled in this art that various changes and modifications may be made therein without departing from the spirit or scope of the invention.

What is claimed is:

1. A pneumatic tire of a cap/base construction having a TRA rated maximum load limit of at least about 1220 kg at an inflation pressure in a range of about 723 kpa to about 792 kpa (about 105 to about 115 psi) and a bead diameter of at least about 48 cm (19 inches), characterized in that, for its tread of cap/base construction:

(A) the tread cap is comprised of, based on 100 parts by weight (phr) elastomers (1) elastomers consisting of (a) about 50 to about 65 phr of cis 1,4-polyisoprene natural rubber, (b) about 20 to about 40 phr of cis 1,4-polybutadiene rubber and (c) about 10 to about 15 phr of isoprene/butadiene copolymer rubber having an isoprene content in a range of about 20 to about 40 percent and a Tg in a range of about −60° C. to about −90° C., (2) silica and carbon black reinforcing filler comprised of (a) about 10 to about 15 phr of particulate, precipitated silica, and, correspondingly, (b) about 35 to about 45 phr of reinforcing carbon black, (3) at least one silica coupler having a moiety reactive with the surface of the silica and an additional moiety interactive with the said elastomers, and (B) the tread base is comprised of 100 parts by weight cis 1,4-polyisoprene natural rubber reinforced with about 20 to about 60 phr of reinforcing filler composed of about 20 to about 45 phr of carbon black.

2. The tire of claim 1 wherein said silica for said tread cap is characterized by having a BET surface area of about 160 to about 200 m²/g and a DBP absorption value in a range of about 150 to about 350 cc/100 gm.

3. The tire of claim 1 where, for said tread cap, the said coupler is a bis-3-(trialkoxysilylalkyl) polysulfide having a polysulfide bridge containing from 2 to about 8 connecting sulfur atoms.

4. The tire of claim 1 where, for said tread cap, the said coupler is composed of bis-3-(triethoxysilylpropyl) tetrasulfide.

5. The tire of claim 1 having a TRA rated load limit in a range of about 2043 kg to about 5000 kg, at an inflation pressure in a range of about 723 to about 792 kpa and a bead diameter in a range of about 48 to about 64 cm.

\* \* \* \* \*